Figure 1:
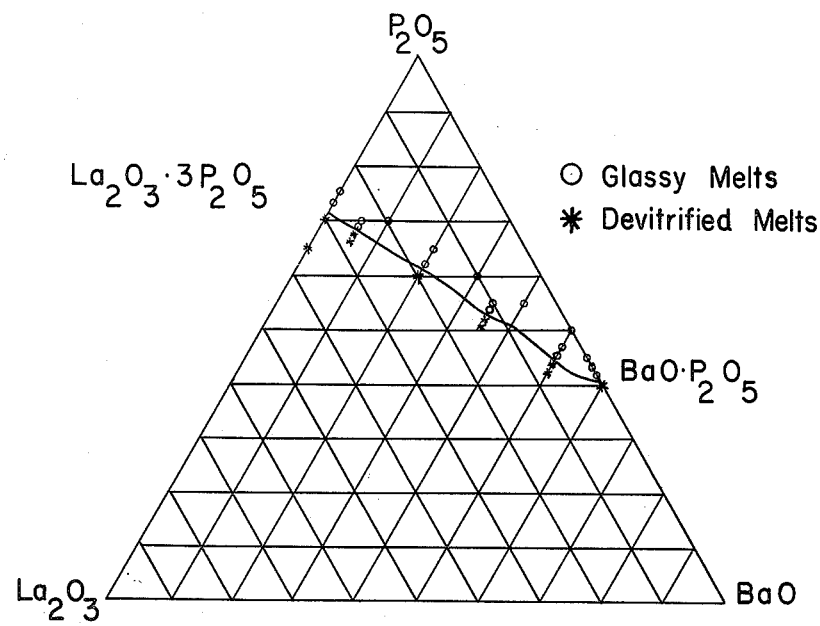

March 6, 1951  N. J. KREIDL  2,544,460

HIGH INDEX PHOSPHATE GLASSES

Filed June 23, 1947

NORBERT J. KREIDL
Inventor

Patented Mar. 6, 1951

2,544,460

UNITED STATES PATENT OFFICE 2,544,460

HIGH INDEX PHOSPHATE GLASS

Norbert J. Kreidl, Rochester, N. Y., assignor to Bausch & Lomb Optical Company, Rochester, N. Y., a corporation of New York Application June 23, 1947, Serial No. 756,546

3 Claims. (Cl. 106—47)

The specification which follows relates to an improved type of high index phosphate glasses for optical purposes.

The applicability of phosphate glasses for optical lenses has already been noted to a certain extent. Some reference to this is to be found summarized in the article of Norbert J. Kreidl and Woldemar A. Weyl entitled Phosphate Glasses, reported in the Journal American Ceramic Society, September 1941, vol. 24, pp. 372–378 and the accompanying citations. The utility of phosphate glasses is due to peculiar properties and what is termed in the above report as an unusual run of dispersion.

The usual run of dispersion in glass is best described by saying that for most glasses the partial dispersion ratios, that is the ratios of the dispersions in a given, e. g. blue color area of the visible spectrum, over the mean dispersion between the F and C lines of the spectrum, are entirely dependent on the reciprocal relative dispersion $$V = \frac{n_D - 1}{n_F - n_C}$$

An example of a partial dispersion ratio is $$\frac{n_G - n_F}{n_F - n_C}$$

The rule then is expressed by $$\frac{n_G - n_F}{n_F - n_C} = K \frac{n_D - 1}{n_F - n_C}$$

(K is constant for almost all glasses.)

This rule prevents a suitable selection of glasses for correction of the secondary spectrum which would require glasses of equal partial dispersion ratios and widely different V values.

Extreme borate and phosphate glasses are useful for this purpose since for the borate glasses K tends to be smaller and for the phosphate glasses larger than usual. In other words, phosphate glasses are said to lengthen the blue part of the spectrum.

There are two factors which limit the usefulness of such phosphate glasses. In the first place, the greater number of them are chemically unstable and dissolve in water, alkalis and acids. In the second place the indices are low and differ less from each other than is the case in the types of glasses based upon silicates, borates and borosilicates. It is believed that this is due to the fact that glasses containing pentavalent phosphorus instead of trivalent boron and tetravalent silicon obviously have a higher concentration of oxygen which lowers or equalizes the indices obtainable when present with cations promoting high indices, for example, barium and the like.

It has been found that as a rule, phosphate glasses have indices below 1.58 and above 1.50. This makes it impossible to derive in the area of dense barium crowns defined by indices around 1.60, glasses of the particular property of lengthening the blue spectrum. More generally it makes it impossible to obtain phosphate crown glasses for any specific properties one may wish to utilize if indices of 1.60 are desired, even if the ions usually used for this purpose such as Sr, Ba and Zn are utilized.

The most useful phosphate and the one having the highest index when applied to optical glasses is barium metaphosphate ($BaO.P_2O_5$) which has a refractive index of 1.58.

Phosphate glasses in general are notable, however, for their weak resistance to solubility in water, etc. (instability).

In the development of optical glasses containing controlling proportions of lanthanum oxide and their greater stability, it has now been discovered that the addition of phosphorus pentoxide to lanthanum oxide produces in an optical glass marked increase in refractive index and high reciprocal relative dispersion.

The term glass is used in its ordinary sense as referring to a vitreous fusion or melt of two or more compounds. Such a glass or melt is obtained by the fusion of phosphorus pentoxide and lanthanum oxide alone and may represent a phosphate of lanthanum the particular composition of which depends upon the ratio of the ingredients and the possible presence of an excess of one of the ingredients. The term glass, however, is comprehensive of a composition containing a large number of ingredients, the sole limiting factor being the vitreous physical characteristic. It is of course understood that glass-making is well known as merely the conventional process of fusion or melting.

Fundamentally, the combination of lanthanum oxide with phosphorus pentoxide alone causes a strong increase in refractive index over fused lanthanum oxide alone even though the phosphorus pentoxide is in relatively minor proportion. However, when the ratio is such that the product is lanthanum metaphosphate $$(La_2O_3.3P_2O_5)$$

then a glass is produced having an index as high as 1.60. Moreover, this lanthanum metaphosphate can be combined in all ratios with barium metaphosphate ($BaO.P_2O_5$) which latter has a refractive index of 1.58. The addition of lanthanum metaphosphate raises this index materially. The reciprocal relative dispersion $$v = \frac{n_D - 1}{n_F - n_C}$$

is not lowered too much. It is found to be 60.

Figure 2:
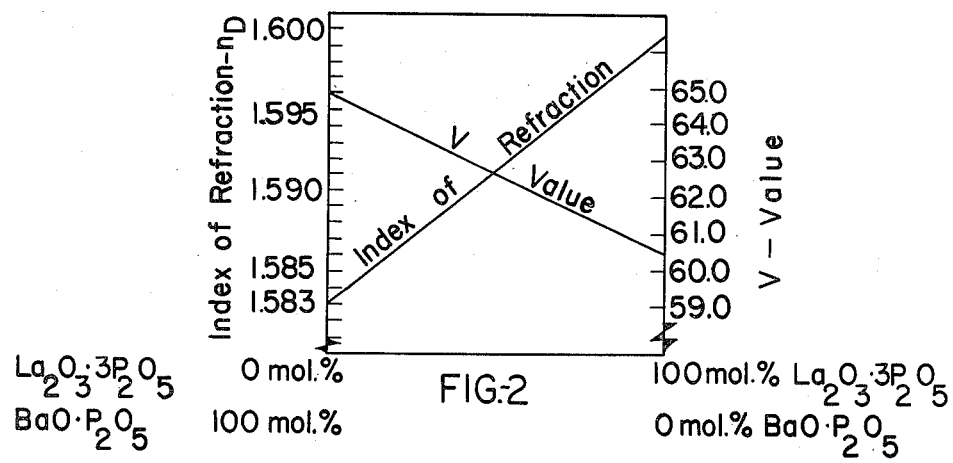

In order to indicate graphically the essential features of the invention, I have shown its characteristics on the accompanying drawing wherein Fig. 1 is a graph on triangular coordinates which represents glass compositions of the ternary system $BaO$—$La_2O_3$—$P_2O_5$ and Fig. 2 is a chart on rectangular coordinates showing relative indices of refraction and V-values for variations in the relation between the lanthanum and barium present.

The actual boundary of the maximum advantageous contents for lanthanum oxide and barium oxide is given in Fig. 1. The composition cannot be varied to introduce a greater total of barium oxide and lanthanum oxide than exists in the metaphosphate compositions themselves. That is, there cannot be much more of these oxides present than is represented stoichiometrically by the following ratio: $(x+3y)P_2O_5 = xBaO + yLa_2O_3$.

More than the calculated amount of phosphate pentoxide may be introduced although an excessive amount is less desirable unless circumstances absolutely require its use. It is to be added, however, that the glasses thus obtained and indicated by Fig. 1 can be combined easily in the same way with all other glass-forming elements as is well known in the art of making glass in general and particularly phosphate glasses. Metaphosphates in particular combine easily with barium and lanthanum metaphosphates.

All of such phosphate glasses are stabilized against solutions in water and reagents by alumina or aluminum phosphates, particularly aluminum metaphosphates.

The chart in Fig. 2 illustrates the indices of the combinations thus obtained and also shows that the reciprocal relative dispersions are high, running from 60 in the case of lanthanum phosphate glass alone to 64 in the barium-lanthanum phosphate glass.

What I claim is:

1. An optical glass composition consisting of equimolar proportions of barium metaphosphate and lanthanum metaphosphate.

2. An optical glass composition consisting of equimolar proportions of barium metaphosphate and lanthanum metaphosphate with a minor excess of phosphorus pentoxide.

3. An optical glass composition consisting of approximately from 42% of barium metaphosphate and 58% of lanthanum mataphosphate to 75% of barium metaphosphate and 25% of lanthanum metaphosphate.

NORBERT J. KREIDL.

No references cited.